United States Patent
Shah et al.

(10) Patent No.: US 8,645,567 B2
(45) Date of Patent: Feb. 4, 2014

(54) METHOD AND SYSTEM FOR PACKET FILTERING FOR LOCAL HOST-MANAGEMENT CONTROLLER PASS-THROUGH COMMUNICATION VIA NETWORK CONTROLLER

(75) Inventors: Hemal Shah, Trabuco Canyon, CA (US); Scott McDaniel, Villa Park, CA (US); Protip Roy, San Diego, CA (US); Rafi Shalom, Givat Shmuel, IL (US); Tim Sharp, Tustin, CA (US); Steve Lindsay, Bend, OR (US)

(73) Assignee: Broadcom Corporation, Irvine, CA (US)

( * ) Notice: Subject to any disclaimer, the term of this patent is extended or adjusted under 35 U.S.C. 154(b) by 207 days.

(21) Appl. No.: 12/575,300

(22) Filed: Oct. 7, 2009

(65) Prior Publication Data

US 2010/0192218 A1    Jul. 29, 2010

Related U.S. Application Data

(60) Provisional application No. 61/147,949, filed on Jan. 28, 2009, provisional application No. 61/228,255, filed on Jul. 24, 2009.

(51) Int. Cl.
*G06F 15/173* (2006.01)

(52) U.S. Cl.
USPC ............................ 709/238; 709/239; 709/240

(58) Field of Classification Search
USPC .............................. 709/238, 239, 240; 726/13
See application file for complete search history.

(56) References Cited

U.S. PATENT DOCUMENTS

| | | | |
|---|---|---|---|
| 7,299,296 B1* | 11/2007 | Lo et al. ........................ | 709/238 |
| 2007/0083924 A1* | 4/2007 | Lu .................................. | 726/13 |
| 2007/0204337 A1* | 8/2007 | Schnackenberg et al. ...... | 726/11 |
| 2008/0052774 A1* | 2/2008 | Chesla et al. .................... | 726/13 |
| 2008/0065767 A1* | 3/2008 | Stachura et al. ............... | 709/224 |
| 2008/0109545 A1* | 5/2008 | Shah .............................. | 709/223 |
| 2009/0080419 A1* | 3/2009 | Kutch ............................ | 370/389 |

OTHER PUBLICATIONS

Distributed Management Task Force; "Network Controller Sideband Interface (NC-SI) Specification"; Distributed Management Task Force; Jun. 26, 2007; Revision 1.0.0a; all pages.*

* cited by examiner

*Primary Examiner* — Umar Cheema
(74) *Attorney, Agent, or Firm* — Thomas | Horstemeyer, LLP

(57) ABSTRACT

A network controller in a communication device may be operable to provide pass-through communication of local host-management traffic between a local host and a management controller within the communication device, wherein the local host may be operable to utilize its network processing resources during communication of the local host-management traffic. The network controller may use packet filtering to provide the pass-through communication, wherein the network controller may utilize a plurality filtering rules during filtering of packets received in the network controller. The filtering rules may specify packet processing and/or forwarding actions by said network controller based on one or more specified conditions. The specified conditions may based on one or more match criteria; wherein the match criteria comprising source address, destination address, and/or traffic type data in the received packets. Address learning mechanisms may be used in the network controller to enable configuring and/or performing packet filtering transparently.

21 Claims, 6 Drawing Sheets

METHOD AND SYSTEM FOR PACKET FILTERING FOR LOCAL HOST-MANAGEMENT CONTROLLER PASS-THROUGH COMMUNICATION VIA NETWORK CONTROLLER

CROSS-REFERENCE TO RELATED APPLICATIONS/INCORPORATION BY REFERENCE

This patent application makes reference to, claims priority to and claims benefit from U.S. Provisional Application Ser. No. 61/147,949 filed on Jan. 28, 2009, and U.S. Provisional Application Ser. No. 61/228,255 filed on Jul. 24, 2009.

Each of the above stated applications is hereby incorporated herein by reference in its entirety.

FEDERALLY SPONSORED RESEARCH OR DEVELOPMENT

[Not Applicable].

MICROFICHE/COPYRIGHT REFERENCE

[Not Applicable].

FIELD OF THE INVENTION

Certain embodiments of the invention relate to device management. More specifically, certain embodiments of the invention relate to a method and system for packet filtering for local host-management controller pass-through communication via a network controller.

BACKGROUND OF THE INVENTION

Information Technology (IT) management may require performing remote management operations of remote systems to perform inventory, monitoring, control, and/or to determine whether remote systems are up-to-date. For example, management devices and/or consoles may perform such operations as discovering and/or navigating management resources in a network, manipulating and/or administrating management resources, requesting and/or controlling subscribing and/or unsubscribing operations, and executing and/or specific management methods and/or procedures. Management devices and/or consoles may communicate with devices in a network to ensure availability of remote systems, to monitor/control remote systems, to validate that systems may be up-to-date, and/or to perform any security patch updates that may be necessary.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for packet filtering for local host-management controller pass-through communication via a network controller, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for packet filtering for local host-management controller pass-through communication via a network controller. In various embodiments of the invention, a network controller in a communication device may be operable to provide pass-through routing of local host-management traffic between a local host and a management controller within the communication device. The local host may be operable to utilize its network processing resources and functions during communication of the local host-management traffic via the network controller. Communication between the network controller and the management controller may be performed based on the Network Controller Sideband Interface (NC-SI) protocol. The network controller may be operable to utilize, via a plurality of filters for example, packet filtering of packets received via the network controller during the pass-through routing to determine whether to forward any of the received packets to the local host and/or the management controller to facilitate local host-management communication. The packet filtering may be performed on inbound packets received from external network links supported via the network controller, on outbound packets communicated via the management controller, and/or on outbound packets communicated via the local host. The packet filtering may be based on, for example, medium access control (MAC) addressing information in received packets. The packet filters in the network controller may be configured to perform packet filtering of received packets based on filtering rules. The filtering rules may specify processing and/or forwarding actions by the network controller based on one or more specified conditions. The specified conditions may be based on one or more match criteria, wherein the match criteria may comprise source addressing data, destination addressing data, and/or traffic type data included in the received packets. Exemplary traffic types comprise unicast, multicast, broadcast, and/or virtual local area network (VLAN) based traffic. A plurality of routing learning mechanisms may be utilized in the network controller to enable performing the packet filtering in the network controller, during pass-through routing, independent from, and/or transparent to the local host and/or the management controller. The routing learning mechanisms may comprise a MAC address learning mechanism, wherein the network controller may be operable to generate, maintain, and/or update MAC address matching data.

Figure 1:
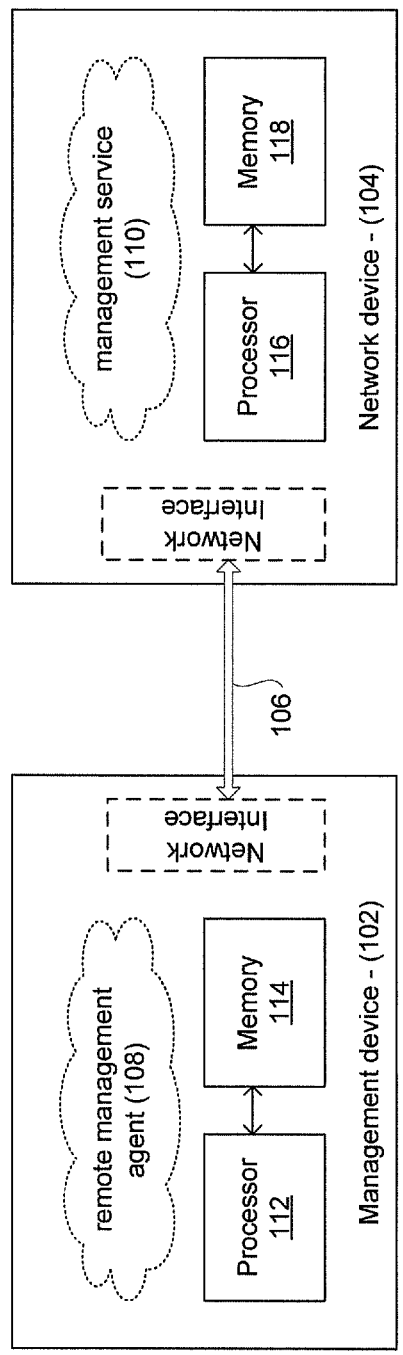
FIG. 1 is a block diagram that illustrates an exemplary communication setup between a management device and a network device, which may be utilized in accordance with an embodiment of the invention.

FIG. 1 is a block diagram that illustrates an exemplary communication setup between a management device and a network device, which may be utilized in accordance with an embodiment of the invention. Referring to FIG. 1, there is shown a management device 102, a network device 104, a management connection 106, a remote management agent 108, a management service 110, a processor 112, a memory 114, a processor 116, and a memory 118.

The management device 102 may comprise suitable logic, circuitry, code, and/or interfaces that may enable management of network devices, for example the network device 104, via a management connection, for example the management connection 106. For example, the management device 102 may be utilized by Information Technology (IT) operators and/or system administrators to enable management of a plurality of devices in an IT network. The management device 102 may comprise the processor 112, the memory 114, and/or the remote management agent 108, to enable performing management operations. Exemplary management operations may comprise discovering and/or navigating management resources in a network, manipulating and/or administrating management resources, requesting and/or controlling subscribing and/or unsubscribing operations, and executing and/or specific management methods and/or procedures. The management device 102 may perform management operations, via the remote management agent 108 for example, wherein the management device 102 may utilize a network interface to communicate with devices in a network via the management connection 106.

The remote management agent 108 may comprise a dedicated entity that is operable to enable performing management operations in the management device 102. The remote management agent 108 may comprise suitable logic, circuitry, code, and/or interfaces that may enable performing management operations based on one or more management standards. For example, the remote management agent 108 may enable performing control and/or management operations, based on Web Service Management (WS-Management) and/or Alert Standard Format/Intelligent Platform Management Initiative (ASF/IPMI) protocols. The remote management agent 108 may comprise a logical and/or software entity that may be integrated within an OS running in the management device 102; a logical and/or software entity that may be integrated within a network controller (NIC) which may be running in the management device 102; and/or a logical and/or software entity that may be integrated within a dedicated management sub-system within the management device 102.

The processor 112 may comprise suitable logic, circuitry, code, and/or interfaces that may enable performing control and/or processing operations in the management device 102. The invention may not be limited to a specific processor, but may comprise for example, a general purpose processor, a specialized processor or any combination of suitable hardware, firmware, software and/or code, which may be enabled to support and/or control operations of the management device 102. The memory 114 may comprise suitable logic, circuitry, code, and/or interfaces that may enable permanent and/or non-permanent storage and fetch of data and/or code used by the processor 112, for example, during management related processing operations. In this regard, the memory 114 may comprise different memory technologies, or combinations thereof, including, for example, read-only memory (ROM), random access memory (RAM), and/or Flash memory.

The network device 104 may comprise suitable logic, circuitry, code, and/or interfaces that may enable performing management operations that may be initiated and/or requested by one or more management devices, for example the management device 102, via a management connection, for example the management connection 106. The network device 104 may be integrated into a network that may be managed by one or more instances of the management device 102. For example, the network device 104 may comprise a personal computer (PC), or a server, which may be operated in a network managed by the management device 102. The network device 104 may comprise the processor 116, the memory 118, and/or the management service 110 to enable participating in management operation, in a network that may be managed via the management device 102.

The management service 110 may comprise a dedicated entity that is operable to enable performing and/or supporting management operations in the network device 104. The management service 110 may comprise logic, circuitry, and/or code that may enable performing management operation based on one or more management standards. For example, the management service 110 may enable participating in control and/or management operations, based on WS-Management and/or ASF/IPMI protocols. The management service 110 may comprise a logical and/or software entity that may be integrated within an OS running in the network device 104; a logical and/or software entity that may be integrated within a network controller (NIC) which may be running in the network device 104; and/or a logical and/or software entity that may be integrated within a dedicated management sub-system within the network device 104.

The processor 116 may comprise suitable logic, circuitry, code, and/or interfaces that may enable performing control and/or processing operations in the network device 104. The invention may not be limited to a specific processor, but may comprise for example, a general purpose processor, a specialized processor or any combination of suitable hardware, firmware, software and/or code, which may be enabled to support management based operations in accordance with the various embodiments of the invention. The memory 118 may comprise suitable logic, circuitry, code, and/or interfaces that may enable permanent and/or non-permanent storage and fetch of data and/or code used by the processor 116, for example, during management related processing operations. In this regard, the memory 118 may comprise different combinations of memory technologies, including, for example, read-only memory (ROM), random access memory (RAM), and/or Flash memory.

The management connection 106 may comprise networking interfaces and/or link that may enable communicating management based traffic between management devices, for example the management device 102, and network devices such as the network device 104. For example, the management connection 106 may comprise Ethernet (IEEE 802.3) based networking connections, which may be operable to communicate management and/or non-management traffic packets, to and/or from the network device 104, to facilitate exchange of management messaging and/or data between the management device 102 and the network device 104.

In operation, management operations may be performed in the management device 102, wherein network packets may be communicated between the management device 102 and the network device 104 via the management connection 106, wherein the network packets may comprise management messaging and/or data based on one or more standards-based management protocols. For example, the remote management agent 108 and/or the management service 110 may enable utilizing WS-Management and/or ASF/IPMI messaging, via the management connection 106, to enable management operations between the management device 102 and the network device 104.

The ASF/IPMI protocol is a first generation management standard that may be utilized to perform out-of-band management operations, where network devices may be managed remotely by system administrators. The ASF/IPMI protocol based management may comprise use of User Datagram Protocol (UDP) based stack to enable communication between management devices and network devices. Devices comprising ASF/IPMI functionality and/or interfaces may be ASF/IPMI capable, wherein said devices may perform management operations via ASF/IPMI messages. For example, in instances where the network device 104 may be ASF/IPMI capable, the management device 102 may utilize ASF/IPMI based messaging to perform management of the network device 104.

More recently, the WS-Management protocol has been developed as the next generation management protocol. WS-Management is based on Web Services, which typically utilize SOAP (XML based messaging) and/or HTTP(S) as a SOAP transport for communications. SOAP over HTTP(S) may require use of HTTP/TLS/TCP stack implementation, which may ensure improved security, reliability, and OS-independence. Within the WS-Management protocol, the Common Information Model (CIM) has been defined to provide object oriented representation of management data and/or managed subsystem which may be utilized during WS-Management operations. Managed devices may also comprise Intelligent Platform Management Interface (IPMI) and/or ASF/IPMI internal interfaces/protocols to support out-of-band management operations that may be performed via WS-Management messages. For example, the network device 104 may comprise a WS-Management stack to support receiving and/or sending WS-Management based messaging to enable supporting remote management operations in the network device 104, by the management device 102 for example.

The WS-Management stack may enable generating and/or processing WS-Management based data and/or messaging that may be utilized to request and/or perform management services based on, for example, CIM binding. The WS-Management stack may enable implementing and/or using WS-Management services standards. The network device 104 may also comprise an IPMI stack to facilitate internal communications between components of the network device 104, during management operations for example. Consequently, TCP/IP based communications, via the management connection 106, may be utilized during WS-Management operations between the management device 102 and the network device 104. The management device 102 and/or the network device 104 may utilize network cards (NIC) to enable sending and/or receiving network traffic via the management connection 106. Network controllers that may be utilized in the management device 102 and/or the network device 104 may process network traffic that may comprise WS-Management based messaging, which may be transmitted and/or received via TCP/IP packets.

In an exemplary aspect of the invention, the network device 104 may be configured to enable performing management operations locally, by interacting directly, for example, with the network device 104, utilizing similar mechanisms as the ones used during remote management operations. For example, rather than accessing the network device 104 remotely, via the management device 102, system administrators may perform management operations directly in the network device 104. In an embodiment of the invention, similar functionality and/or interfaces that may be used to communicate during management operations performed via the management device 102 may also be used directly via the network device 104. For example, a web browser based function may be supported, via the network device 104, to enable performing and/or triggering WS-Management based operations directly within the network device 104. Consequently, the network device 104 may be operable to support local management messaging that is communicated from/to the network device 104 in similar fashion as remote management messaging that is communicated via network traffic.

Figure 2A:
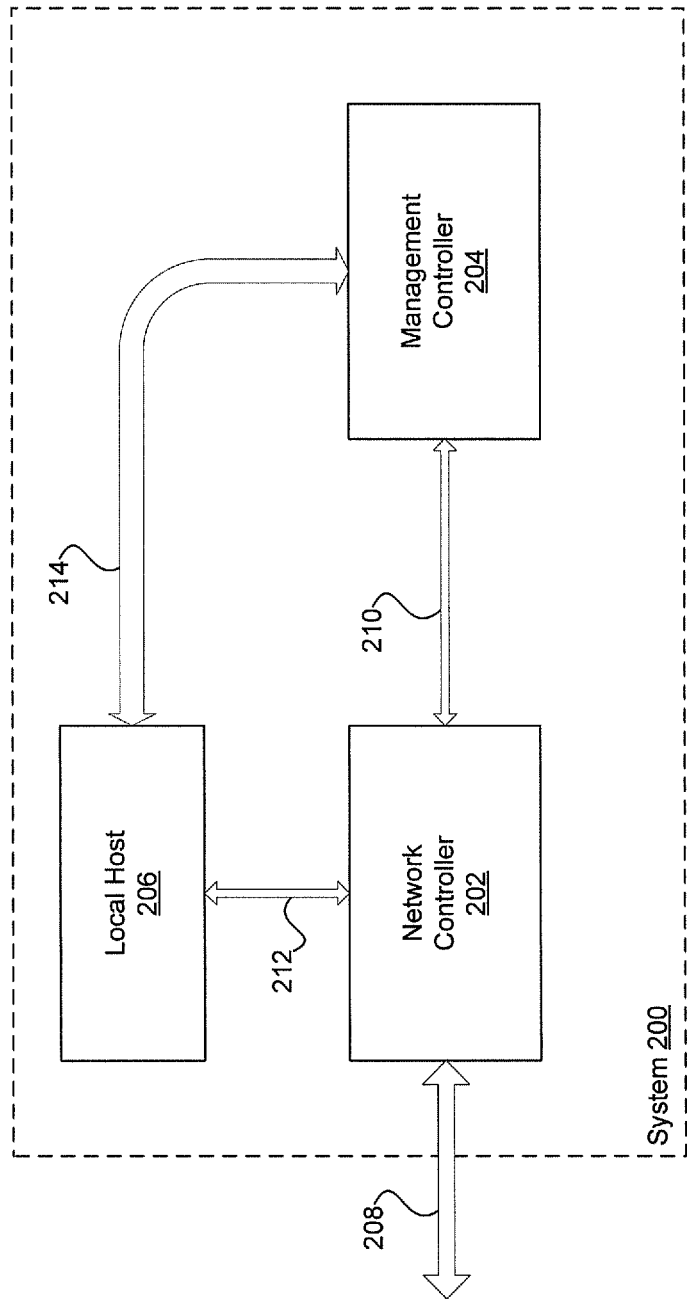
FIG. 2A is a block diagram that illustrates an exemplary system that comprises a network controller and a management controller, which may be utilized to enable processing of network and management traffic, in accordance with an embodiment of the invention.

FIG. 2A is a block diagram that illustrates an exemplary system that comprises a network controller and a management controller, which may be utilized to enable processing of network and management traffic, in accordance with an embodiment of the invention. Referring to FIG. 2A, there is shown a system 200, a network controller 202, a management controller 204, a local host 206, network traffic 208, management traffic 210, host traffic 212, and host-management link 214.

The system 200 may comprise the network controller 202, the management controller 204, the local host 206, and may also comprise suitable logic, circuitry, code, and/or interfaces that may enable reception, transmission, and/or processing of network traffic; and/or participating in management operations based on one or more management standards. For example, the system 200 may be integrated in, and/or may correspond to various components in the network device 104, and may enable the network device 104 to participate in WS-Management and/or ASF/IPMI management operations, substantially as described in FIG. 1A.

The network controller 202 may comprise suitable logic, circuitry, code, and/or interfaces which may enable processing of the network traffic 208. The network traffic 208 may comprise received and/or transmitted network packets communicated via a network connection, for example an Ethernet (IEEE 802.3) connection. The network traffic 208 may comprise packets that are sent to and/or from the local host 206, which may be communicated between the network controller 202 and the local host 206 via the host traffic 212. The host traffic 212 may be communicated via one or more connections based on one or more interfaces. For example, the host traffic 212 may be communicated via a Peripheral Component Interconnect Express (PCI-E) bus.

The network controller 202 may also be operable to communicate with the management controller 204 to enable exchange of management based messaging and/or data, via the management traffic 210, which may be communicated between the management controller 204 and external devices, for example. In that regard, the management traffic 210 may comprise data and/or messages that may be transmitted and/or or received in the system 200 during management operations. For example, the management traffic 210 may comprise WS-Management based messaging communicated by the system 200 to enable performing of WS-Management services. The management traffic 210 may be communicated, for example, via Network Controller Sideband Interface (NC-SI) based connections.

The management controller 204 may comprise suitable logic, circuitry, code, and/or interfaces that may enable managing and/or controlling management based operations. The management controller 204 may be operable to process management messaging and/or data, received and/or transmitted via the network controller 202 for example, which may be based on a specific management standard including the WS-Management standard for example. In that regard, the management controller 204 may be operable to determine and/or perform management operations based on the WS-Management stack. The management controller 204 may also be operable to interact with other components in the system 200 to communicate, manage, control, and/or process management messaging and/or data. For example, the management controller 204 may be enabled to communicate with the local host 206 to enable performing management operations that are requested and/or controlled locally and/or directly via the system 200. The management controller 204 may communicate directly with the local host 206 via a Low Pin Count (LPC) bus, for example.

In operation, the network controller 202 may enable processing network traffic 208. In the downlink direction, the network controller 202 may be operable to process network packets to separate and/or route inbound host-based and management-based messaging. In the uplink direction, the network controller 202 may be operable to receive messages which originate from the local host 206 and/or the management controller 204. The network controller 202 may then generate network packets that may be communicated external to the system 200, by the network traffic 208. The management controller 204 may be utilized, in the system 200, to handle the processing management messages and/or data received from external devices and/or systems, and/or to perform, manage, and/or control management operations, based on the WS-Management standard for example.

In an exemplary aspect of the invention, the management controller 204 may be operable to perform, manage, and/or control management operations that may be initiated and/or requested directly and/or locally in the system 200. Local interactions with the system 200 may be facilitated via, for example, a web browser-based interface, which may be supported via the local host 206. The local host 206 may communicate the management commands and/or requests to the management controller 204, and/or receive management related data and/or responses, via the host-management link 214. Presently, network devices do not support intelligent filtering capabilities to enable local host to local management controller communications using standard networking stack via standard network interfaces. Without such filtering capabilities described in this invention, local hosts and local management controllers may not be able to communicate using unmodified networking stacks and network interfaces. In this regard, network controllers that lack intelligent filtering capabilities will not be able to route network traffic, within network devices, between local hosts and local management controllers. Direct interfacing between the management controller 204 and the local host 206, via the host-management link 214, may be register based and/or bus based, and may require dedicated communication transport stacks that may be unique to the interfaces used. Communication via the host-management link 214 may utilize, for example, Keyboard Controller Style (KCS) based interfaces to facilitated communication via a LPC bus. Use of dedicated and/or direct host-management interfacing, however, may not be desirable because it may require additional and/or dedicated support via the local host 206 and/or the management controller 204. The local host 206 may also need to have knowledge about the management controller 204 and/or the local host 206, and/or their available interfacing capabilities, to facilitate such direct interfacing. This may also lead to requiring use of separate communication stacks, via the local host 206 and/or management controller 204, based on whether management communication, via the local host 206, is local or remote. In addition, use of a dedicated host-management link (e.g., via LPC bus) may degrade performance due to limitations in data transfer rates. In addition, delays may also be caused by necessary interface-specific processing on both ends. For example, in cases where a WS-Management stack is utilized, in the local host 206, to perform management operations requested remotely, a different stack, an IPMI based stack for example, may be utilized to enable use of an LPC based interface to communicate with the management controller 204. Therefore, different application programming interface (API) and/or access protocol may be used and/or needed during direct host-management controller interaction via the host-management link 214.

In various embodiments of the invention, the network controller 202 may be operable to provide pass-through routing support, wherein the local host-management controller traffic may be communicated via the network controller 202 to make use of, for example, already existing interfaces between the network controller 202, and the local host 206 and the management controller 204, respectively. For example, a local host-management routing functionality may be provided via the network controller 202, which may enable communication of management messages and/or data between the local host 206 and the management controller 204 using existing network processing function in the local host 206, such that the management messages and/or data may be communicated as network messages. The network controller 202 may be operable to provide pass-through communication support to facilitate local host-management traffic routing, wherein the network controller 202 may provide and/or support, for example, control and/or configuration logic, packet filtering capabilities, and/or communication interfaces to enable such communication between the local host 206 and the management controller 204.

In an exemplary aspect of the invention, the network controller 202 may be operable to utilize packet filtering to provide pass-through routing between the local host 206 and the management controller 204, to facilitate, for example, use of the local host to run local management operation in the system 200 by using management functionality available via the management controller 204. The network controller 202 may be operable, for example, to forward traffic received from the local host 206, which may comprise management related messages and/or data, external to the system 200 and/or to the management controller 204. Similarly, the network controller 202 may also be operable to forward traffic received from the management controller 204, which may comprise management related messages and/or data, external to the system 200, to facilitate out-of-band management operations for example, and/or to the local host 206, during local management operations. The packet filtering operations performed in the network controller 202 may be based on, for example, addressing information included in the packets received from the local host 206 and/or the management controller 204. For example, the network controller 202 may be operable to use medium access control (MAC) addresses, which may be unique to the local host 206 and/or the management controller 204, to determine whether and/or how to forward packets between the local host 206 and the management controller 204. The local host 206 and/or the management controller 204 may be operable to communicate with, and/or configure the network controller 202 to enable initializing, controlling, and/or managing the packet filtering operations in the network controller 202. The network controller 202 may also be operable to utilize learning mechanism to facilitate intelligent filtering, wherein the network controller 202 may be operable to generate, update, and/or maintain packet forwarding parameters based on, for example, monitoring of addressing information and/or forwarding operations prior to initiating local host-management communication in the system 200.

Figure 2B:
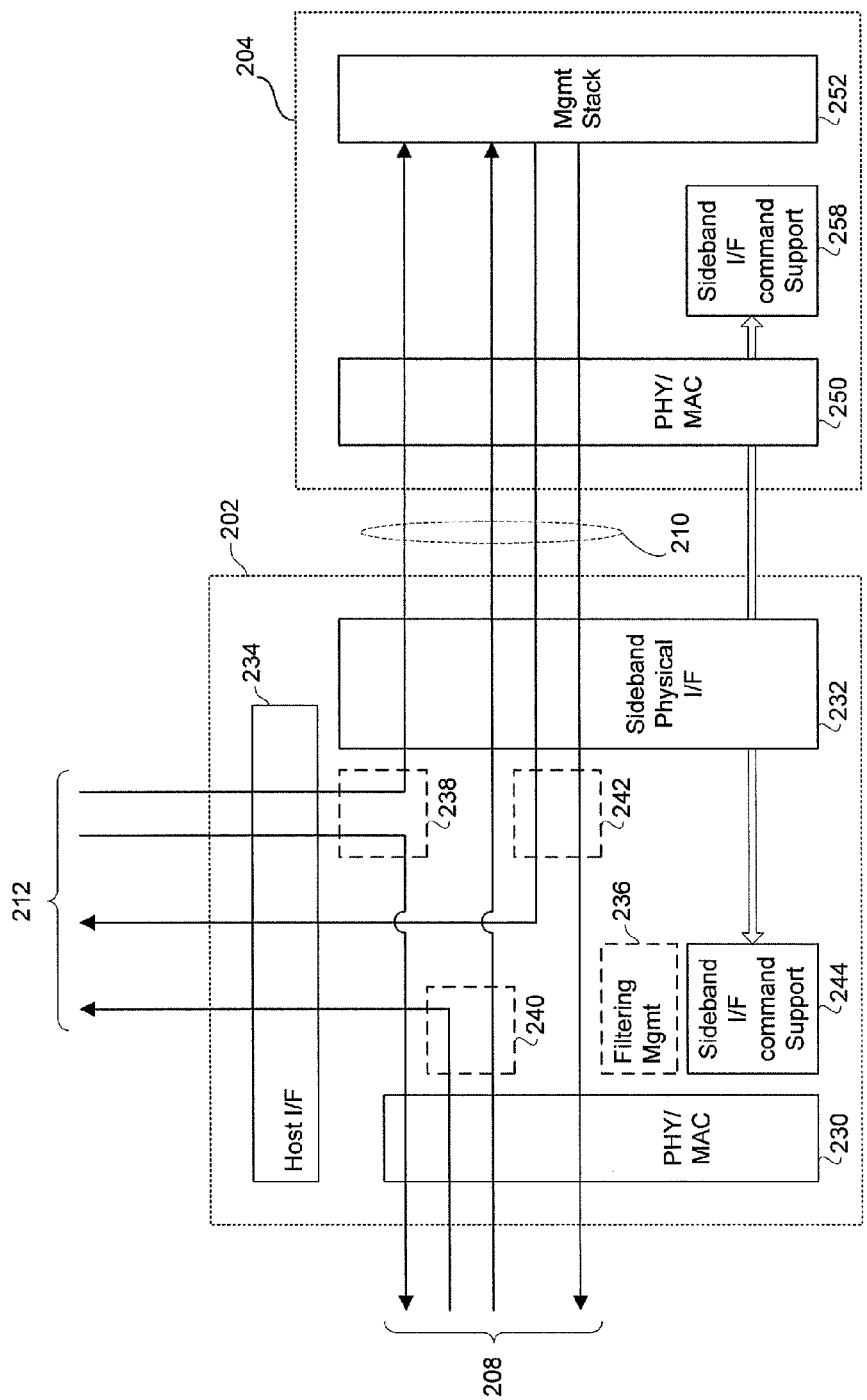
FIG. 2B is a block diagram illustrating an exemplary pass-though local host-management controller communication using packet filtering via a network controller in a system, in accordance with an embodiment of the invention.

FIG. 2B is a block diagram illustrating an exemplary passthough local host-management controller communication using packet filtering via a network controller in a system, in accordance with an embodiment of the invention. Referring to FIG. 2B, there is shown the network controller 202, the management controller 204, a network-side physical layer/medium access control access (PHY/MAC) processing module 230, and a sideband physical interface module 232. There is also shown a host interface 234, a filtering management module 236, an outbound host packet filtering module 238, an inbound network packet filtering module 240, an outbound management packet filtering module 242, network-side sideband interface command support module 244, a management-side PHY/MAC processing module 250, a management stack processing module 252, and a management-side sideband interface command support module 258.

The network-side PHY/MAC processing module 230 may comprise suitable logic, circuitry, code, and/or interfaces that may enable performing PHY and MAC processing operations within the network controller 202 during external transmission and/or reception of data. The network-side PHY/MAC processing module 230 may be operable to enable physical transmission and/or reception of bit streams, which may correspond to transmitted and/or received network packets, via physical links that may be based on one or more network connectivity standards, including Ethernet (IEEE 802.3) physical layer interface for example. The network-side PHY/MAC processing module 230 may also be operable to perform MAC addressing and/or channel access management operations, which may be based on one or more specific network connectivity standards. For example, in instances where the network traffic 208 may be transmitted and/or received via Ethernet (IEEE 802.3) connections, the network-side PHY/MAC processing module 230 may enabled performing MAC operations based on the Carrier Sense Multiple Access With Collision Detection (CSMA/CD) protocol.

The sideband physical interface module 232 may comprise suitable logic, circuitry, code, and/or interfaces that may be operable to provide physical transfer of data between network controller 202 and the management controller 204 based on one or more supported sideband interfaces. The physical connectivity and/or data transport operations of the sideband physical interface module 232 may be based on, for example, the Reduced Media Independent Interface (RMII) protocol. The data transferred via the sideband physical interface module 232 may comprise, for example, Ethernet frames that may comprise PHY/MAC addressing information. Communication between the network controller 202 and the management controller 204 may be performed based on the network controller sideband interface (NC-SI), which is a DMTF based sideband interfacing protocol that defines interfacing between a management controllers and network controllers during transmission and/or reception of management traffic by the management controllers via the network controllers, during out-of-band management operations for example. In this regard, the network-side sideband interface command support module 244 and/or the management-side sideband interface command support module 258 may be operable to, for example, support NC-SI based communication between the network controller 202 and the management controller 204. The network-side sideband interface command support module 244 and the management-side sideband interface command support module 258 may similarly be operable to provide command support if other sideband interface protocols are used.

The host interface 234 may comprise suitable logic, circuitry, code, and/or interfaces that may enable data communication between the network controller 202 and the local host 206. The host interface 234 may support physical transfer of data between the network controller 202 and the local host 206 utilizing an inter-system bus. For example, the host interface 234 may utilize a Peripheral Component Interconnect Express (PCI-e) bus to communicate host traffic to and/or from the network controller 202.

The network controller 202 may utilize packet filtering to provide pass-through routing support for local host-management communication between the local host 206 and the management controller 204. The filtering operations may be performed, for example, via the filtering management module 236, the outbound host packet filtering module 238, the inbound network packet filtering module 240, and/or the outbound management packet filtering module 242. The filtering management module 236 may comprise suitable logic, circuitry, code, and/or interfaces that may enable managing filtering operations within the network controller 202.

The filtering management module 236 may be operable to, for example, configure, control, and/or manage operations of the outbound host packet filtering module 238, the inbound network packet filtering module 240, and/or the outbound management packet filtering module 242. The outbound host packet filtering module 238 may comprise suitable logic, circuitry, code, and/or interfaces that may enable filtering packets received in the network controller 202 and originating from the local host 206, via the host interface 234 for example. The outbound host packet filtering module 238 may be operable to determine whether to route these packets internally to the management controller 204 and/or external to the system 200. The inbound network packet filtering module 240 may comprise suitable logic, circuitry, code, and/or interfaces that may enable filtering of external network packets received in the network controller 202. The inbound network packet filtering module 240 may be operable to determine whether to drop and/or forward the received packets, determining, for example, whether to route these packets to the local host 206 and/or to the management controller 204. The outbound management packet filtering module 242 may comprise suitable logic, circuitry, code, and/or interfaces that may enable filtering packets received in the network controller 202 and originating from the management controller 204, via the sideband physical interface module 232 for example. The outbound management packet filtering module 242 may be operable to determine whether to route the packets internally to the local host 206 and/or external to the system 200.

The management-side PHY/MAC processing module 250 may comprise suitable logic, circuitry, code, and/or interfaces that may enable performing PHY and MAC processing during communication of data between the management controller 204 and the network controller 202. The management-side PHY/MAC processing module 250 may be operable to enable performing physical transfer of data comprising PHY/MAC based addressing. The external networking interface of the managment controller 204 may comprise suitable logic, circuitry, code, and/or interfaces that may enable processing of packets that are communicated between the management controller 204 and one or more external entities and/or devices via the network controller 202.

The management stack processing module 252 may comprise suitable logic, circuitry, code, and/or interfaces that may enable processing messaging and/or data based on one or more management standards, during management operations for example. The management stack processing module 252 may be operable to support WS-Management based messaging and/or data. The host interface of the management controller 204 may comprise suitable logic, circuitry, code, and/or interfaces that may enable processing of packets that are communicated between the management controller 204 and the local host 206 via the network controller 202. The host interface may comprise, for example, a server function that may enable providing addressing information may enable simulating a network-like path to enable the local host 206 to communicate with the management controller 204 via the network controller 202.

In operation, the network controller 202 may enable external communication for the local host 206 and/or the management controller 204. The network controller 202 may be operable to transmit and/or receive Ethernet packets that may comprise data and/or messages originating from and/or destined for the local host 206 and/or the management controller 204, which may be communicated by external entities and/or devices. The network-side PHY/MAC processing module 230 may be operable, for example, to perform physical layer and/or MAC operations. Received external network packets may be filtered via the inbound network packet filtering module 240 in order to determine whether these packets are destined for the local host 206 or to the management controller 204. The filtering may be performed based on the MAC/IP addressing information corresponding to the local host 206 and/or management controller 204. Based on this determination, the packets may be routed accordingly.

Data communicated between the local host 206 and one or more external devices may be transferred between the local host 206 and the network controller 202 via the external networking port in the host interface 234. During out-of-band management operations, network packets comprising management data and/or messaging may be communicated by the remote management agent 108, via the management connection 106, to the system 200 where the network controller 202 may be operable to receive and/or transmit the network packets. External networking packets may be communicated between the management controller 204 and the network controller 202 using, for example, NC-SI interface. The sideband physical interface module 232 and/or the management-side PHY/MAC processing module 250 may provide physical transfer of data between the network controller 202 and the management controller 204.

The network controller 202 may be operable to provide pass-through routing operations to enable and/or support local host-management communication between the local host 206 and the management controller 204, using, for example, existing interfaces between the network controller 202 and the local host 206, and/or between the network controller 202 and the management controller 204. The local host-management communication between the local host 206 and the management controller 204, via the network controller 202, may simulate, for example, network traffic to enable use of networking functionality and/or networking support in the local host 206 and/or management controller 204. Accordingly, the local host 206 may be operable to transmit and/or receive, via the host interface 234 in the network controller 202, packets comprising local management messages and/or data during local management operations in the system 200. Similarly, the management controller 204 may transmit and/or receive, via the sideband physical interface module 232 in the network controller 202 and/or based on, for example, the NC-SI interface between the management controller 204 and the network controller 202, packets comprising local management messages and/or data.

In an exemplary embodiment of the invention, the communication of local management packets via the network controller 202 may be performed by the local host 206 and/or the management controller 204 using the same functions otherwise used in the local host 206 and/or the management controller 204 to perform external networking communication via the network controller 202. The network controller 202 may be operable to utilize packet filtering, for example, to determine how and/or when to forward packets locally within the system 200 rather than communicating these packets external to the system 200. The network controller 202 may utilize, for example, the filtering management module 236, the outbound host packet filtering module 238, the inbound network packet filtering module 240, and/or the outbound management packet filtering module 242 to enable filtering packets received via the network controller 202, locally and/or externally, during pass-through routing support in the system 200. The packet filtering operations may be performed, for example, based on a determination that one or more matching conditions were met.

A plurality of filtering rules may be specified for the outbound host packet filtering module 238, the inbound network packet filtering module 240, and/or the outbound management packet filtering module 242 to enable determining if a received packet is successfully matched, and/or to specify appropriate actions when a match is made. The filtering rules may be utilized, via the filtering management module 236 for example, to configure the outbound host packet filtering module 238, the inbound network packet filtering module 240, and/or the outbound management packet filtering module 242 to enable use of packet filtering to provide pass-through routing of local host-management traffic via the network controller 202. The filtering rules may comprise one or more match conditions, which may be based on, for example, source, destination, and/or traffic type information; and/or corresponding packet forwarding actions that may be taken when possible matches are determine during filtering of packets received via the network controller 202.

The inbound network packet filtering module 240 may be configured, for example, to forward received network packets from external entities via the network traffic 208, to the local host 206 and/or to the management controller 204. The forwarding operations of the inbound network packet filtering module 240 may be performed, for example, based on destination MAC address data in the received packets and/or based on determination of the type of traffic. Exemplary types of traffic may comprise unicast traffic, multicast traffic, broadcast traffic, and virtual local area network (VLAN) based traffic. With unicast traffic, for example, packets with destination MAC address matching that of the local host 206 may be forwarded to the local host 206, and packets with destination MAC address matching that of the management controller 204 may be forwarded to the management controller 204. In instances where no matches are found, the packets may be dropped, or, alternatively, may be forwarded to local host 206 and/or the management controller 204, where they may be further processed to determine whether to accept or drop them. With broadcast traffic and/or multicast traffic, which may be determined based on a match between the destination MAC address in the received packets and one or more predetermined and/or reserved values, the inbound network packet filtering module 240 may be configured to forward the packets to the local host 206 and/or the management controller 204. Further matching criteria may also be utilized when configuring the inbound network packet filtering module 240 for processing multicast and/or broadcast traffic packets.

The additional matching criteria may require examining one or more header and/or payload fields in the received packets. For example, where the received packets may comprise Ethernet frames, forwarding operations may depend on determination of the value of the EtherType, which may be utilized to determine a communication protocol associated with the received packets. With VLAN traffic, similar criteria as used with unicast, multicast, and/or broadcast traffic may be utilized, in conjunction with additional criteria that may be specific to VLAN tagging data in the received packets, during forwarding operations. Configuring the inbound network packet filtering module 240 may be performed, for example, via the filtering management module 236 in the network controller 202. In addition, the configuration may be performed based on input, commands, and/or requests sent by the local host 206 and/or the management controller 204. For example, the local host 206 may specify, through communication via the host interface 234, that the inbound network packet filtering module 240 be configured to forward received inbound network unicast traffic packets with the destination MAC field that matches specified MAC addressed, all broadcast packets, and all multicast packets to the local host 206. The local host 206 may also specify that all VLAN untagged and VLAN tagged packets are forwarded to the local host 206, in conjunction with default and/or specified settings for unicast, multicast, and broadcast traffic. The management controller 204 may utilize, for example, available and/or applicable NC-SI based commands to specify filtering rules that are applicable to packets that are forwarded to the management controller via the inbound network packet filtering module 240.

The outbound host packet filtering module 238 may similarly be configured, using dedicated set of filtering rules, via the filtering management module 236, and/or based on input and commands from the local host 206 and/or the management controller 204, to enable routing packets communicated by local host 206. The received outbound host packets may be forwarded external to the system 200, via the network traffic 208, and/or to the management controller 204. For example, with unicast traffic packets sent by the local host 206, the outbound host packet filtering module 238 may be configured to match the destination MAC address in the received packet with the MAC addressing information corresponding to the management controller 204. In instances where a match is found, the received packets may be forwarded to the management controller 204; otherwise, the packets may be forwarded external to the system 200.

The configuring of the filtering and/or forwarding operations of the outbound host packet filtering module 238 may be achieved by specifying, for example, that the filtering rules applicable to inbound multicast and broadcast network traffic are utilized to determine whether the outbound host traffic is forwarded to the management controller 204. In other words, the same set of multicast and broadcast filtering rules may be applied and/or utilized for both inbound network packets and outbound host traffic with regard to packet forwarding to the management controller 204.

The outbound management packet filtering module 242 may also be similarly configured, using yet another dedicated set of filtering rules, via the filtering management module 236, and/or based on input and commends from the local host 206 and/or the management controller 204, to enable routing packets communicated by management controller 204. The received outbound management packets may be forwarded external to the system 200, via the network traffic 208, and/or to the local host 206. For example, with unicast traffic packets sent by the management controller 204, the outbound management packet filtering module 242 may be configured to match the destination MAC address in the received packet with the MAC addressing information corresponding to the local host 206; and to determine, accordingly, whether the received packets may be forwarded to the local host 206 and/or external to the system 200. The configuring of the filtering and/or forwarding operations of the outbound management packet filtering module 242 may further be simplified by specifying, for example, any unmatched outbound unicast management packets, and/or all outbound multicast and/or broadcast packets are forwarded to both the local host 206 and external to the system 200 via the network traffic 208.

The network controller 202 may be operable to perform pass-through routing transparently to enhance routing of local host-management traffic between the local host 206 and the management controller 204. The pass-through routing may be transparent in that it may require no and/or limited participation by the local host 206 and/or the management controller 204 during configuration, and/or use of packet filtering operations in the network controller 202. For example, various MAC address learning mechanisms may be utilized independently in the network controller 202, via the filtering management module 236 for example, to enable generating, maintaining, and/or updating local routing information based on MAC addressing data. The network controller 202 may monitor, for example, destination MAC addresses in received inbound packets, which may be filtered via the inbound network packet filtering module 240, and correlate these destination MAC addresses with, for example, the local host 206 and/or the management controller 204. Subsequently, during filtering of outbound host and/or management traffic, for example, the stored MAC addresses may be utilized to determine whether to route received packet locally within the system 200.

In instances where the management controller 204 and/or the local host 206 may utilize, for example, different and/or unique MAC addresses and/or TCP ports to send and/or receive external and/or internal traffic packets, the network controller 202 may utilize a source MAC address learning mechanism. During source MAC learning operations, the source MAC addresses and/or ports of inbound network traffic packets and/or outbound host traffic packets, which may be forwarded to the management controller 204 via the inbound network packet filtering module 240 and/or the outbound host packet filtering module 238 in the network controller 202, may be tracked and/or monitored. This information may then be stored via the filtering management module 236, and may subsequently be utilized to match destination MAC addresses and/or port used during filtering of outbound management traffic via the outbound management packet filtering module 242. Furthermore, the network controller 202 may monitor, via the outbound management packet filtering module 242, the source MAC addresses and/or ports of packets communicated by the management controller 204 via the network controller 202, and may store, via the filtering management module 236 for example, this information.

The filtering management module 236 may then generate and/or update routing traffic during local host-management communication based on stored source MAC addressing and/or port information for packets forwarded to, and/or sent from the management controller 204. For example, the destination MAC address and/or port information in the outbound management packets may be matched against previously stored source MAC address and/or port information of inbound management packets to determine whether to forward the received outbound management packets to the local host 206 and/or external to the system 200. Forwarding outbound management packets may also be performed based on matching of the source MAC address and/or port with previously monitored destination MAC address and/or port information in inbound management packets. In instances where no match may be found, the outbound management packets may be forwarded to both the local host 206 and external to the system 200, by default, since the local host 206 may be operable to, based on standard network processing operations, simply drop any packet received that are not actually destined for it.

Figure 3A:
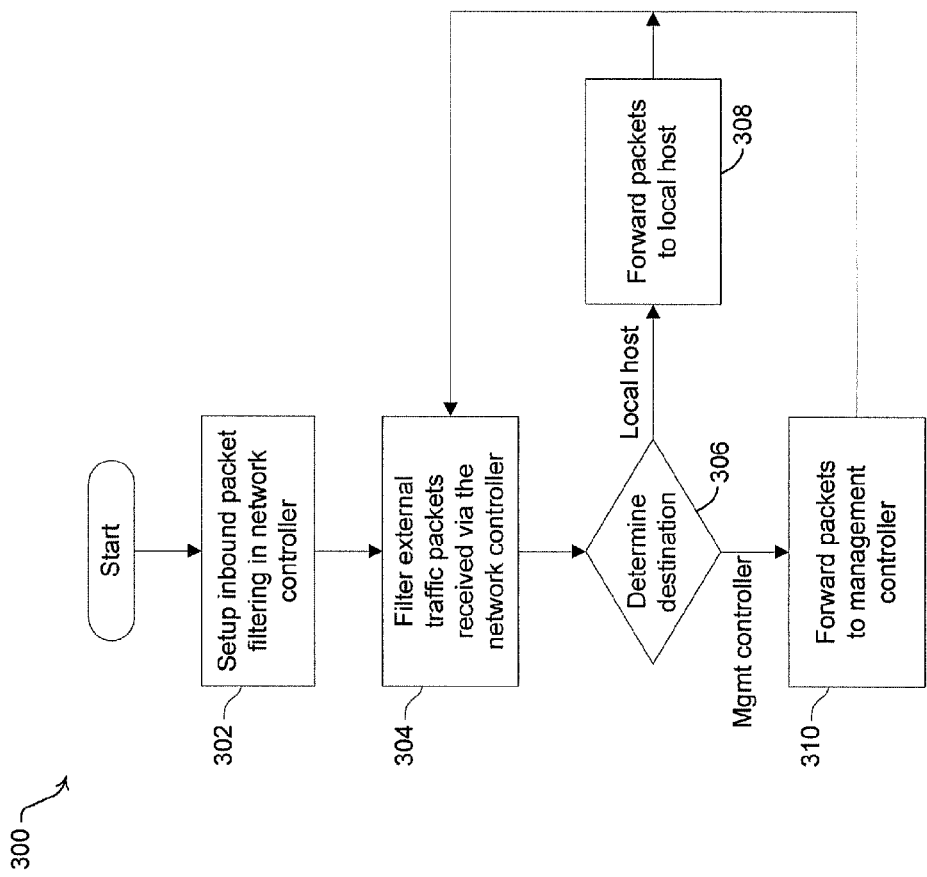
FIG. 3A is a flow chart that illustrates exemplary use of packet filtering during inbound traffic processing in a network controller that provides local host-management pass-through routing, in accordance with an embodiment of the invention.

FIG. 3A is a flow chart that illustrates exemplary use of packet filtering during inbound traffic processing in a network controller that provides local host-management pass-through routing, in accordance with an embodiment of the invention. Referring to FIG. 3A, there is shown a flow chart 300 comprising a plurality of exemplary steps, which may enable use of packet filtering to process inbound traffic during pass-through routing in a network controller to facilitate local host-management controller communication.

In step 302, inbound packet filtering may be setup in a network controller. For example, the inbound network packet filtering module 240 may be setup and/or configured in the network controller 202 to enable filtering network packets received in the system 200, via the network traffic 208. Configuring of the inbound network packet filtering module 240 may be performed, for example, via the filtering management module 236, and may be done based on preexisting and/or predetermined filtering rules and/or based input and/or commands received from the local host 206 and/or the management controller 204, substantially as described with regard to, for example, FIG. 2B. The filtering rules used in configuring the inbound network packet filtering module 240 may comprise one or more match criteria and/or processing actions.

In step 304, filtering of network packets received from external links in the network controller 202 may be performed. For example, network packets received in the network controller 202, via the network traffic 208, may be filtered via the inbound network packet filtering module 240. During packet filtering, matching criteria, specified via filtering rules for the inbound network packet filtering module 240 for example, may be utilized to determine appropriate processing of the received network packets. Exemplary packet processing actions may comprise dropping the received network packets or forwarding them to the local host 206 and/or the management controller 204. In step 306, a determination of forwarding destination of the received network packets may be performed in the network controller 202.

The matching criteria, which may comprise one or more match conditions based on source, destination, and/or traffic type information in received network packets, may be utilized to determine whether and/or how the received network packets may be forwarded. The packet forwarding may be based on determination of, for example, the destination MAC address information in the received packet. In instances where it may be determined that the received network packets received are destined for the local host 206, the exemplary steps may proceed to step 308. In step 308, the received network packets may be forwarded to the local host 206, via the host interface 234 for example.

Returning to step 306, in instances where it may be determined that the received network packets are destined for the management controller 204, the exemplary steps may proceed to step 310. In step 310, the received network packets may be forwarded to the management controller 204, based on, for example, the NC-SI interface, via the sideband physical interface module 232 and the management-side PHY/MAC processing module 250. In certain instances, received network packets may be forwarded both to the local host 206 and the management controller 204 at the same time, substantially as described with regard to, for example, FIG. 2B.

Figure 3B:
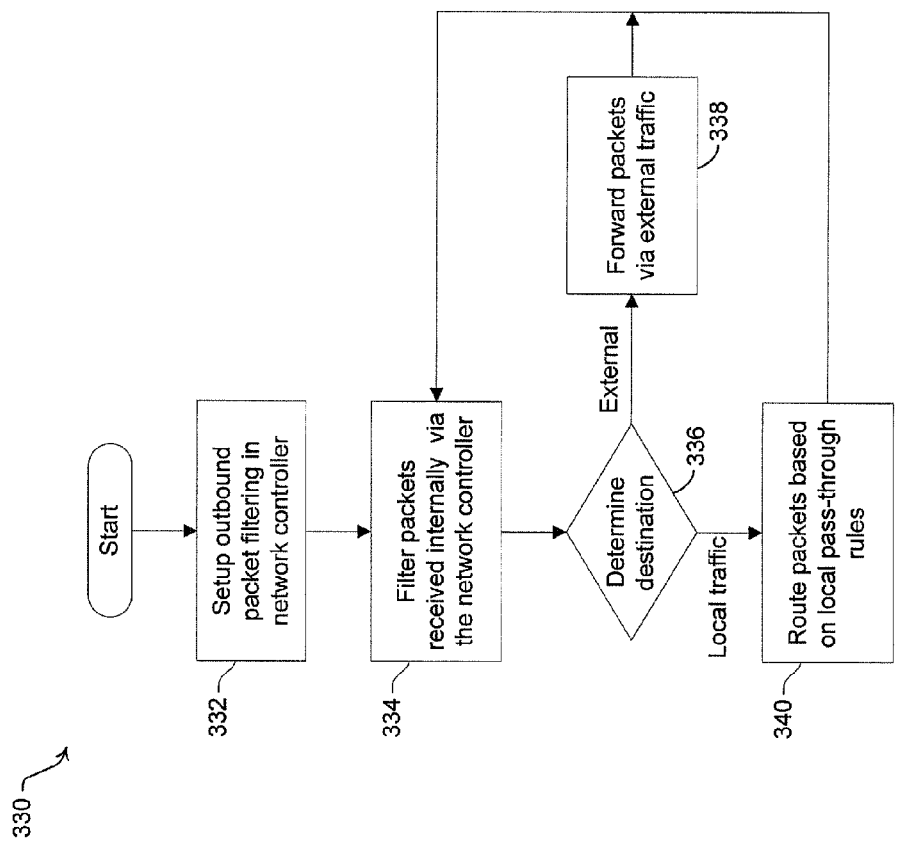
FIG. 3B is a flow chart that illustrates exemplary use of packet filtering during outbound traffic processing in a network controller that provides local host-management pass-through routing, in accordance with an embodiment of the invention.

FIG. 3B is a flow chart that illustrates exemplary use of packet filtering during outbound traffic processing in a network controller that provides local host-management pass-through routing, in accordance with an embodiment of the invention. Referring to FIG. 3B, there is shown a flow chart 330 comprising a plurality of exemplary steps, which may enable use of packet filtering to process outbound traffic during pass-through routing in a network controller to facilitate local host-management controller communication.

In step 332, outbound packet filtering may be setup in a network controller. For example, the outbound host packet filtering module 238 and/or the outbound management packet filtering module 242 may be setup and/or configured in the network controller 202 to enable filtering packets received in the network controller 202 from the local host 206 and/or the management controller 204, respectively. Configuring the outbound host packet filtering module 238 and/or the outbound management packet filtering module 242 may be performed, for example, via the filtering management module 236, and may be done based on preexisting and/or predetermined filtering rules and/or based input and/or commands received from the local host 206 and/or the management controller 204, substantially as described with regard to, for example, FIG. 2B. The filtering rules used in configuring the outbound host packet filtering module 238 and/or the outbound management packet filtering module 242 may comprise one or more match criteria and/or processing actions.

In step 334, filtering of packets received internally in the network controller 202 may be performed. For example, packets received in the network controller 202 from the local host 206 and/or the management controller 204 may be filtered via the outbound host packet filtering module 238 and/or the outbound management packet filtering module 242. During filtering operations, matching criteria, specified, for example, via filtering rules for the outbound host packet filtering module 238 and/or the outbound management packet filtering module 242 may be utilized to determine appropriate processing of the received packets, which may comprise dropping the received packets or forwarding them to the local host 206 and/or the management controller 204. The filtering rules may enable use of the network controller 202 to provide, via packet filtering, pass-through routing of packets between the local host 206 and the management controller 204 to enable local host-management communication, substantially as described with regard to, for example, FIG. 2B.

In step 336, a determination of forwarding destination of the received packets may be performed in the network controller 202. The determination of packet forwarding destination may be based on matching based on one or more match parameters, including source, destination, and/or traffic type information in the received packets. In instances where it may be determined that the received packets received are to be forwarded externally, the exemplary steps may proceed to step 338. In step 338, the received packets may be processed via the network-side PHY/MAC processing module 230 for transmission as network packets via the network traffic 208.

Returning to step 336, in instances where it may be determined that the received packets are to be forwarded locally, within the system 200, the exemplary steps may proceed to step 340. In step 340, local forwarding of the received packets may be performed. For example, received packets destined for the local host 206 may be forwarded to the local host 206 via the host interface 234. Similarly, received packets destined for the management controller 204 may be forwarded to the management controller 204, based on, for example, the NC-SI interface, via the sideband physical interface module 232 and the management-side PHY/MAC processing module 250. In certain instances, received packets may be forwarded both locally, to the local host 206 and/or the management controller 204, and externally, via the network traffic 208, at the same time, substantially as described with regard to, for example, FIG. 2B.

Figure 3C:
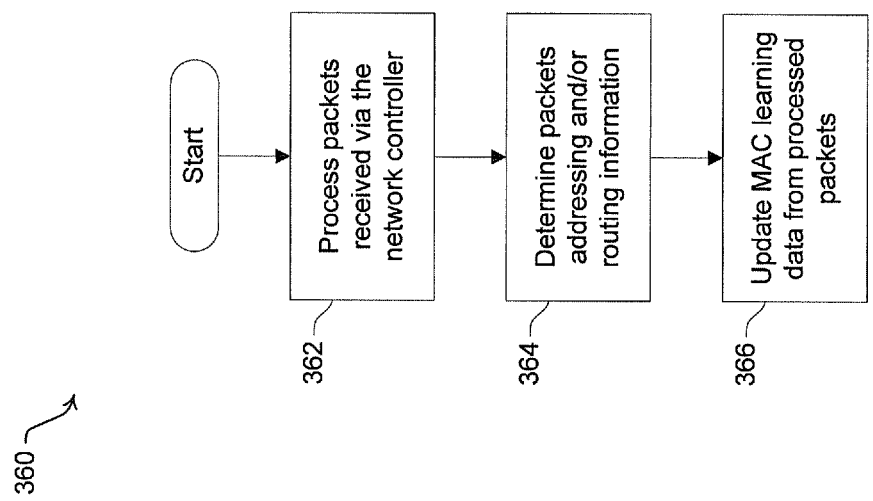
FIG. 3C is a flow chart that illustrates exemplary use of source MAC address learning mechanism during host and management communication routing via a network controller in a system, in accordance with an embodiment of the invention.

FIG. 3C is a flow chart that illustrates exemplary use of source MAC address learning mechanism during host and management communication routing via a network controller in a system, in accordance with an embodiment of the invention. Referring to FIG. 3C, there is shown a flow chart 360 comprising a plurality of exemplary steps, which may enable use of source MAC address learning during message forwarding operations in a network controller, which may be utilized during pass-through routing in the network controller.

In step 362, packets received in the network controller 202 may be processed. The network controller 202 may be operable to process packets received via the network traffic 208, from the local host 206, and/or the management controller 204; via the inbound network packet filtering module 240, the outbound host packet filtering module 238, and/or the outbound management packet filtering module 242, respectively, for example. In step 364, the network controller 202 may be operable to determine addressing and/or routing related information in the received packets. For example, the network controller 202 may be operable to determine and/or track source MAC addressing and/or port information in received packets via the outbound host packet filtering module 238, the inbound network packet filtering module 240, and/or the outbound management packet filtering module 242. In step 366, the tracked addressing and/or routing related information maybe utilized to generate and/or update MAC learning based routing information in the network controller 202. For example, tracked and/or monitored source MAC addresses may be utilized to generate and/or update, via the filtering management module 236 for example, routing information. The routing information may be based on source MAC learning mechanisms used in the network controller 202; substantially as described with regard to, for example, FIG. 2B.

Various embodiments of the invention may comprise a method and system for packet filtering for local host-management controller pass-through communication via network controller. The network controller 202 in a system 200 may be operable to provide pass-through routing of local host-management traffic between the local host 206 and the management controller 204 within the system 200. The local host 206 may be operable to utilize its network processing resources and/or functions during communication of the local host-management traffic via the network controller 202. Communication between the network controller 202 and the management controller 204 may be performed, for example, based on the Network Controller Sideband Interface (NC-SI) protocol. The network controller 202 may be operable to utilize packets filtering of packets received via the network controller 202 during the pass-through routing to determine whether to forward any of the received packets to the local host 206 and/or the management controller 204 to facilitate local host-management communication. For example, the filtering management module 236, an outbound host packet filtering module 238, an inbound network packet filtering module 240, an outbound management packet filtering module 242 may be utilized to perform packet filtering operations in network controller 202. The packet filtering may be performed on inbound packets, via the inbound network packet filtering module 240, which may be received from external network links supported via the network controller 202; on outbound packets communicated via the management controller 204, via the outbound management packet filtering module 242; and/or on outbound packets communicated via the local host, via the outbound host packet filtering module 238. Packet filtering in the network controller 202 may be configured and/or managed via the filtering management module 236, wherein configuration of filtering operations may be performed based on filtering rules. The filtering rules may specify processing and/or forwarding actions by the network controller 202 based on one or more specified conditions. The specified conditions may be based on one or more match criteria, wherein the match criteria may comprise source addressing data, destination addressing data, and/or traffic type data included in the received packets. Exemplary traffic types comprise unicast, multicast, broadcast, and/or virtual local area network (VLAN) based traffic. A plurality of routing learning mechanisms may be utilized in the network controller 202, via the filtering management module 236 for example, to enable performing the packet filtering in the network controller 202, during pass-through routing, independent from, and/or transparent to the local host 206 and/or the management controller 204. The routing learning mechanisms may comprise MAC address learning mechanisms, wherein the network controller 202 may be operable to generate, maintain, and/or update MAC address matching data.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for packet filtering for local host-management controller pass-through communication via network controller.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for device management, the method comprising:
   in a network device comprising a local host, a management controller and a network controller:
   providing via said network controller, pass-through communication of local host-management traffic within said network device, between said local host and said management controller; and
   filtering packets received via said network controller during said pass-through communication to determine whether to forward any of said received packets to at least one of: said local host or said management controller, wherein said filtering is performed utilizing one or more of a plurality of filters within said network controller, wherein a first filter among the plurality of filters corresponds to external network packets, a second filter corresponds to packets originating from said management controller, and a third filter corresponds to packets originating from said local host.

2. The method according to claim 1, comprising performing said packet filtering based on one or more packet fields in said received packets.

3. The method according to claim 2, comprising configuring said network controller to perform said filtering of received packets based on filtering rules applied by said plurality of filters.

4. The method according to claim 3, wherein said filtering rules specify forwarding operations by said network controller based on one or more specified conditions.

5. The method according to claim 4, wherein said specified conditions are based on one or more match criteria; wherein said match criteria comprises at least one of: source address, destination address, or traffic type data.

6. The method according to claim 5, wherein said traffic type comprises unicast, multicast, broadcast, and/or virtual local area network (VLAN) based traffic.

7. The method according to claim 1, comprising communicating said local host-management traffic between said network controller and said management controller via a Network Controller Sideband Interface (NC-SI) link.

8. The method according to claim 1, comprising utilizing one or more routing learning mechanisms via said network controller to enable performing said packet filtering in said network controller independent of at least one of: said local host or said management controller.

9. The method according to claim 8, wherein at least some of said one or more routing learning mechanisms enable at least one of: generating, maintaining, or updating MAC address matching data via said network controller.

10. A system for processing communication signals, the system comprising:
    one or more circuits for use in a network device, said network device comprising a local host, a management controller and a network controller, wherein said one or more circuits are operable to provide via said network controller, pass-through communication of local host-management traffic within said network device, between said local host and said management controller;
    a host-management link coupled between said local host and said management controller for communicating management related data directly between said local host and said management controller; and
    said one or more circuits are operable to filter packets received via said network controller during said pass-through communication to determine whether to forward any of said received packets to at least one of: said local host or said management controller.

11. The system according to claim 10, wherein said one or more circuits are operable to perform said packet filtering based on one or more packet fields in said received packets.

12. The system according to claim 11, wherein said one or more circuits are operable to configure said network controller to perform said filtering of received packets based on filtering rules.

13. The system according to claim 12, wherein said filtering rules specify forwarding operations by said network controller based on one or more specified conditions.

14. The system according to claim 13, wherein said specified conditions are based on one or more match criteria; said match criteria comprising source address, destination address, and/or traffic type data.

15. The system according to claim 14, wherein said traffic type comprises unicast, multicast, broadcast, and/or virtual local area network (VLAN) based traffic.

16. The system according to claim 10, wherein said one or more circuits are operable to communicate said local host-management traffic between said network controller and said management controller via a Network Controller Sideband Interface (NC-SI) link.

17. The system according to claim 10, wherein said one or more circuits are operable to utilize one or more routing learning mechanisms via said network controller to enable performing said packet filtering in said network controller independent of said local host and/or said management controller.

18. The system according to claim 17, wherein at least some of said one or more routing learning mechanisms enable generating, maintaining, and/or updating MAC address matching data via said network controller.

19. A system, comprising:
    a network interface controller (NIC) for use in a network device, said network interface controller (NIC) comprising:
    a plurality of interfacing components that comprise:
        a first interfacing component for communicating network traffic external to said network device;
        a second interfacing component for interacting with a management subsystem in said network device; and
        a third interfacing component for interacting with a host subsystem in said network device;
    a plurality of filtering components for routing traffic packets received by said NIC via one of said plurality of interfacing components, through another one of said plurality of interfacing components, wherein said routing comprises forwarding traffic communicated between said host subsystem and said management subsystem, wherein a first filtering component among the filtering components corresponds to external network packets, a second filtering component corresponds to packets originating from said second interfacing component, and a third filtering component corresponds to packets originating from said third interfacing component; and a filtering management component for configuring operations of said plurality of filtering components.

20. The system of claim 19, wherein said filtering management component is operable to configure said plurality of filtering components based on filtering rules that specify forwarding based on one or more match conditions that comprise at least one of: source address, destination address, or traffic type data.

21. The method according to claim 1, wherein said plurality of filters comprises:

an inbound network packet filter configured to filter inbound packets received from external network links;

an outbound management packet filter configured to filter outbound packets communicated via said management controller; and an outbound host packet filter configured to filter outbound packets communicated via said local host.

* * * * *